2,943,018
Patented June 28, 1960

2,943,018
METHODS FOR CONTROLLING PARASITES ATTACKING ANIMALS USING PHOSPHOROATES

Lisby L. Wade and Mark G. Norris, Jr., Lake Jackson, Tex., assignors to The Dow Chemical Company, Midland, Mich., a corporation of Michigan No Drawing. Filed Aug. 1, 1958, Ser. No. 752,407

2 Claims. (Cl. 167—53)

The present invention relates to animal husbandry and is particularly directed to methods and compositions for controlling parasites attacking warm-blooded animals and for improving the growth characteristics of such animals.

Domestic animals are subject to attack by a number of different parasites including fleas, flies, lice, ticks, screwworms and cattle grubs as well as the helminthic parasites such as lungworms, stomachworms, and gastrointestinal worms. The helminthic parasites include the strongyloids, cooperids and ascarids and are the causative agents of ascariasis, trichostrongylosis and gross parasitism. The helminths grow and mature in various organs but particularly the gastro-intestinal tract of their host. In the usual life cycle, the ova pass out of the body with the fecal droppings, hatch and reach their infective stage, whereupon they are ingested during grazing, or as in the case with hookworms, enter the body through the skin. In the case of ascarids, the swallowed eggs or larvae mature usually in the digestive tract. In other cases the maturing process may take place in other parts of the body such as the liver or the lungs as with lungworms. The parasites during maturation and growth have a very deleterious effect upon the animal and its rate of growth. In the intestine, the parasites erode the epithelial tissues bringing about hemorrhage, anemia, weakness and tissue necrosis. Animals, if they do not succumb to gross parasitism, are rendered economically unfit by weakness, lowered vitality, and poor growth and reproduction. It is estimated that the losses accruing to the cattle industry of the United States from gross parasitism amount to about fifty million dollars per year, with yearly losses due solely to mortality running as high as nine million dollars.

One of the undesirable parasites in animals is the cattle grub. This grub is the larval form of the heel fly (*Hypoderma lineatum*), the bomb fly (*Hypoderma bovis*) or the bot fly (*Dermatobia hominis*). The latter fly is found mostly in the Central and South American countries. The heel and bomb flies appear in the United States from February through August and fasten their eggs near the base of the hair on their host. The bot fly is not seasonal in the Central and South American habitat and lays its eggs on an insect such as a mosquito or common fly which carries the eggs to the warm-blooded host. Following their attachment, the eggs of the various flies hatch in four or five days and the larvae bore through the skin of the host. The heel fly larvae migrate to the esophageal region or the abdominal viscera while the bomb fly larvae migrate through the spinal canal. During their life in the host, the larvae feed upon host tissue. After from about three to six months, depending upon the climatic conditions, the larvae locate in the skin and particularly the skin on the back of the host. Here, the larva opens a hole through the skin, usually in the choicest part of the hide, and grows rapidly for about six weeks. The larva thereafter leaves the animal through the hole in the skin, falls to the ground and shortly thereafter, depending upon the prevailing temperature, pupates for its transformation to the adult stage. The organisms cause considerable damage to the carcass of beef animals. In infested areas, losses from beef trimmings and prime leather run as high as ten dollars a carcass. Thus, the yearly loss to the cattle industries of the United States runs into the millions of dollars.

Another undesirable parasite is the screwworm fly (*Callitroga americana*). It can breed only in the tissues of living warm-blooded animals and it must depend upon finding a wounded or diseased part of the host's body in which its young can begin development. This parasite is particularly prevalent in Southern and Southwestern States and in Central and South American countries. In the areas where it normally occurs, it is one of the greatest enemies of all the insect species with which the livestock owner must contend. Under the present system of livestock production, man-made wounds occasioned by marking, branding, shearing, castrating, dehorning, and docking afford ample and fertile breeding grounds for screwworms, as do injuries resulting from such plants as cacti and needlegrass, from fighting, from diseased tissues, and from the attacks of blood-sucking insects. Newborn animals are particularly susceptible to infestation of the navel cord.

The fly generally seeks the edges or a dry portion of the wound on which to deposit eggs. The eggs fasten tightly to the tissue surface in compact shinglelike masses. The eggs hatch in about 11 hours and the young whitish worms immediately burrow into the flesh, where they feed and grow for a period of from 4 to 7 days. The worms, after attaining full growth in the wound, drop to the ground and change to pupa. After about from 7 to 60 days they emerge as flies. The injury done to the animals is inflicted by the worms or maggots. The debilitating effect and the destruction of tissue kill the infested animals in a few days. The screwworm destroys untold numbers of domestic and wild animals and this loss costs livestock owners many millions of dollars annually.

The stable fly (*Stomoxys calcitrans*), also called the stock fly and the biting house fly, is found in all the temperate regions of the world. The adults, both male and female, are vicious bloodsuckers with long, piercing mouth parts that on penetrating the skin cause considerable pain to animals or human beings. This fly has been shown to be capable of carrying such livestock diseases as anthrax, swamp fever, and surra, as well as infantile paralysis of man. Although the stable fly is principally an annoyance to man and animals, in large outbreaks it frequently kills horses and cattle by causing them continuous worry and loss of blood. The milk production of dairy herds is lowered during every stable fly season, the decrease amounting to as much as 50 percent in seasons when the numbers of flies become large. During such seasons dairy cows and other domestic animals have been known to lose as much as 10 to 15 percent of their weight. Stable flies generally attack the lower parts of the animal's body where the animal's tail is less likely to dislodge them but when flies are abundant they may attack all parts of the body. Unmolested flies usually engorge to repletion in 2 to 5 minutes. Some control of stable flies may be achieved by use of traps and sprays. Traps cannot be depended on for good control for stable flies remain on animals for only relatively short periods and therefore only those flies that happen to be on an animal will be caught. Sprays employing contact insecticides are effective only for several hours or at most a day or so, thus for good control, frequent spraying is necessary. Furthermore, sprays employing contact insecticides are ineffective against parasites in all stages of growth.

The treatment of these and other parasites by presently employed methods are inadequate for obtaining good control. Some of the known materials have been of little efficacy, others impractical because of the frequency of treatment required, and still others have an adverse effect on the metabolism of the treated animal. The need for simple and inexpensive methods for the control of parasite infection is well recognized as constituting one of the major problems in animal husbandry.

It is an object of the present invention to provide a new and improved practice in animal husbandry. A further object is to provide an improved method for controlling parasites attacking warm-blooded animals. Another object is the provision of a method wherein a systemic agent is employed for the control of parasites attacking warm-blooded animals. An additional object is the provision of novel compositions adapted to be employed in the new method for controlling parasites. Other objects will become apparent from the following specification and claims.

It has been discovered that by employing certain phosphoroates good control of parasites attacking warm-blooded animals may be obtained. Parasites which may be controlled by this new method include cattle grubs, bots, screwworms, ticks, lice, fleas, mites, helminths and other internal parasites, and flies. Further, the new phosphoroates are found to be readily assimilable by warm-blooded animals and to control parasites attacking flesh, viscera or vascular system of the animals. The present compounds are effective for controlling parasites in all the life stages. Furthermore, these phosphoroates are effective for systemically controlling parasites attacking animals without adversely affecting the animals. Thus, these compounds are of low toxicity to the animals and in addition, they are effective at a very low concentration, heretofore not believed effective. Moreover, these phosphoroates are not bound or incorporated or otherwise retained by fat and other tissues of warm-blooded animals in the manner and to the extent that is the case with other phosphorus containing compounds.

The practice of this invention may be accomplished by an oral administration of phosphoroate, by spraying the animal with a composition comprising the active compound to permit absorption thereof through the skin, or by injecting the animal with a suitable solution of the active compound. In the preferred method for carrying out this invention the phosphoroate compound is administered to the animal to be treated by intramuscular injection. This method of treatment permits rapid absorption of the unaltered form of the phosporoate and further has the advantage of being an effective means for treatment of range cattle and other grazing animals. Furthermore, there is absence of sterile abscesses in their administration.

The phosphoroates of this invention which are particularly valuable are those which have the structure

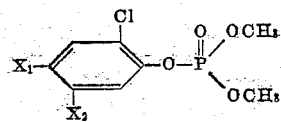

wherein $X_1$ is a member of the group consisting of chloro and tertiary-butyl and $X_2$ is a member of the group consisting of chloro and hydrogen and wherein when $X_1$ is tertiary-butyl, $X_2$ is hydrogen.

In carrying out this invention, a therapeutic dose or dose sufficient to control pathogenic parasite without serious toxic effects on warm-blooded animals is administered to the animal. The exact dose is dependent on the parasite to be controlled and the particular phosphoroate compound employed. Where treatment is for the control of helminths, good results are obtained when the phosphoroates are administered at a dosage of 50 to 150 milligrams per kilogram of body weight of the animal. For the control of flies, fleas, lice and ticks, good results are obtained when the phosphoroates are employed at dosages as low as 25 milligrams per kilogram of body weight, while for the control of screwworms and cattle grubs the phosphoroates give good controls at dosages of 25 milligrams per kilogram or more of body weight. If desired, the compounds may be administered in multiple doses over a period of several days. In such operation, it is preferred to employ a daily dosage of from 2.5 to 15 milligrams per kilogram of body weight.

The process of this invention may be carried out by intramuscular injection of a solution of the phosphoroate compound in a suitable medium. By suitable medium is meant an inert liquid carrier which will not bring about degradation of the phosphoroate compound and further will not irritate or adversely affect the animal to be treated. Suitable liquid carriers include diethyl succinate, ethyl acetate, propylene glycol, ethyl lactate, diethyl adipate, peanut oil and sesame oil.

The systemic control by the novel compounds may also be achieved by administering the phosphoroate to the animals orally in the unmodified form such as in gelatin capsules or pellets, or in admixture with an innocuous adjuvant such as ethanol, water, skimmed milk, syrups, edible oils, or other edible carriers; surface active dispersing agents, edible powders, commercial animal feeds, concentrates and mineral and vitamin supplements. The compounds may also be administered as a spray, preferably in a non-aqueous medium such as in isoparaffin oil. The latter, boiling in the range of kerosene is characterized by low odor, low phytotoxicity and lower toxicity to animals than ordinary hydrocarbon oils of the same boiling range and contain no more than traces of olefins, naphthenes or aromatics and low percentage of normal paraffins. Other liquid medium normally used for animal spray such as kerosene, diesel fuel, as well as aqueous spray compositions wherein the phosphoroate is dispersed with a suitable emulsifying or dispersing agent may also be employed.

The exact concentration of the phosphoroate compounds to be employed in the compositions may vary provided that a sufficient amount be administered to provide the required dosage of the active agent. For example, where direct administration by intramuscular injection is to be employed, it is generally desirable that the injectible solution contain a fairly high concentration of the active agent. A liquid composition containing from about 35 to 55 percent of the agent is considered most practicable. Where direct oral administration to an animal is to be employed, liquid or solid compositions containing from 4 to 95 percent by weight of the phosphoroate may be used to supply the desired dosage. Where the compounds are provided as a constituent of the principal food ration, satisfactory results are obtained with food rations containing a minor but effective amount of the phosphoroate compounds. The exact amount of the compound to be incorporated in the ration is dependent upon the food consumption and feeding habits of the animals concerned. In animals such as pigs and mice, the required dosage may be supplied with feed compositions containing from 0.01 to 1 percent by weight of active agent. In fowl, the required dosage may be supplied with mash compositions containing from 0.01 to 0.25 percent by weight of the systemic agents. Where the compound is provided as a constituent of feed supplements, good results are obtained with supplements containing from 0.5 to 5 percent by weight of the phosphoroate compounds. In compositions to be employed as concentrates, the active agents may be present in a concentration of from 5 to 95 percent by weight.

The administration of a phosphoroate composition by intramuscular injection constitutes the preferred embodiment of the present invention. Such compositions and methods have been found to be of very low toxicity to the warm-blooded animal and to give outstanding controls of parasites.

Although the methods and compositions of the present invention and the phosphoroate compounds therein employed are useful for the control of a number of parasites in warm-blooded animals, such teaching is not to be construed that the methods, compositions and compounds are equivalents for the control of a particular parasite or the life stage of such parasite, or for the control of such parasite or life stage thereof in a particular animal.

Since many of the parasites are seasonal in their appearance, the present invention is advantageously practiced with certain parasites at a particular time of the year. Thus, with cattle grubs, Hypoderma lineatum and bovis, it is preferred that the administration for their control be carried out in the fall and quite soon after the disappearance of the heel and bomb flies. The disappearance of these flies varies somewhat depending upon the climate. For the control of the cattle grub, Dermatobia hominis, in the Central and South American countries, it is desirable that the administration be carried out about four times each year. When following such practices good controls of cattle grubs are obtained with a minimum of damage to the animal from the migration of the grub. Further, the grubs are controlled before they have a chance to adversely affect the animal or its rate of growth, or reduce the value of the animal's hide.

The following examples illustrate the invention but are not to be construed as limiting.

Example 1

An injectible solution of O,O-dimethyl O-(2,4,5-trichlorophenyl) phosphoroate was prepared by dissolving the ester in diethyl succinate to provide a concentration of 500 milligrams of phosphoroate per milliliter of solution.

6 milliliters of solution so prepared was injected intramuscularly in the hip of a 121 kilogram calf infested with cattle grub (Hypoderma lineatum) and screwworm larvae (Callitroga hominvorax). The dosage was sufficient to supply 25 milligrams of O,O-dimethyl O-(2,4,5-trichlorophenyl) phosphoroate per kilogram of body weight.

At the time of treatment, the back of the calf was examined for nodular dermal cysts harboring live cattle grub larvae and found to harbor 4 adult cattle grub larvae. Eight days after treatment it was found that all the grubs were dead.

At the time of treatment the area of a neck wound was heavily infested with screwworm larvae. Twenty-four hours after administration, the wound was examined and it was found that substantially complete kill of screwworm larvae was obtained. Examination of the wound after 48 hours revealed a marked healing with the wound partially scabbed over and of much reduced size.

No adverse effect attributable to the administration of phosphoroate compound was noted.

Example 2

O,O-dimethyl O-(2,4,5-trichlorophenyl) phosphoroate was employed as a systemic agent for the control of stable flies feeding on the skin surfaces of cattle. The composition employed and the dosing operation were as previously described with the phosphoroate compound being administered to a calf at a dosage of 25 milligrams per kilogram of body weight.

One hour after injection, stable flies were allowed to feed on the skin of the animal for a period of 15 minutes and thereafter caged and observed for 24 hours for mortality of the flies. As the result of the treatment a substantially complete kill of stable flies feeding on the calf dosed with O,O-dimethyl O-(2,4,5-trichlorophenyl) phosphoroate was observed. No adverse effect on the calf attributable to the phosphoroate compound was observed following the treatment.

Example 3

A calf weighing 131 kilograms and voiding an average of 46.2 ova of gastro-intestinal nematodes per gram of feces was treated with O,O-dimethyl O-(2,4,5-trichlorophenyl) phosphoroate in the form of a gelatin capsule. The ova include those of Bunostomum sp., Oesophagostomum sp., Ostertagi sp., Trichostrongulus sp. and Cooperia sp. The amount administered corresponded to 100 milligrams per kilogram of body weight. 3 days following the treatment, the feces were examined and found to be substantially free of nematode ova.

Example 4

A sheep weighing 53 kilograms and voiding an average of 93 ova of gastro-intestinal nematodes per gram of feces was treated with O,O-dimethyl O-(4-tertiary-butyl-2-chlorophenyl) phosphoroate in the form of a gelatin capsule. The ova included those of Bunostomum sp., Oesophagostomum sp., Oestertagi sp., Trichostrongulus sp., and Cooperia sp. The amount administered corresponded to 200 milligrams per kilogram of body weight. Following treatment, the sheep voided large numbers of nematodes. Egg counts made six, seven and eight days following treatment showed substantial reduction of nematode ova.

Example 5

O,O-dimethyl O-(2,4-dichlorophenyl) phosphoroate was employed as a systemic agent for the control of stable flies feeding on the skin surfaces of cattle. An injectible composition containing 500 milligrams of the phosphoroate per milliliter of di-ethyl succinate solution was administered in the hip of a 155 kilogram calf at a dosage of 50 milligrams per kilogram of body weight.

One-half hour after injection, stable flies were allowed to feed on the skin surfaces of the animals for a period of 15 minutes and thereafter caged and observed for 24 hours for mortality of the flies. A 100 percent kill of stable flies feeding on the calf dosed with O,O-dimethyl O-(2,4-dichlorophenyl) phosphoroate was observed. No adverse effect on the calf attributable to the phosphoroate compound was observed following the treatment.

Example 6

Six head of cattle infested with bot larva (Dermatobia hominis) are injected in the hip with an injectible ethyl acetate solution of O,O-dimethyl O-(3,4-trichlorophenyl) phosphoroate at a dose of 35 milligrams per kilogram. On the third day following treatment the efficacy of the treatment is determined by extracting all bots from the cyst and determining the percentage that has been killed. It is found that in all of the cattle thus treated, substantially complete kill is obtained. Examination of the cattle five weeks after treatment shows no reinfestation with bots. During this period no toxicity or injurious effect to the cattle is seen.

Example 7

An injectible solution of O,O-dimethyl O-(2,4,5-trichlorophenyl) phosphoroate prepared as described in Example 1 is injected in the hip of a cow having a heavy infestation of short nosed cattle louse, Haematopenus eurysternus. At the time of injection, thousands of lice are found on the cow and the skin along the side of the neck and brisket are denuded of hair by the parasite. The amount administered is sufficient to spray 100 milligrams of O,O-dimethyl O-(2,4,5-trichlorophenyl) phosphoroate per kilogram of body weight of the cow. Examination of the skin surfaces of the cow at the end of 48 hours and 72 hours following treatment show 100 percent kill of the short nosed cattle louse. No adverse effect upon the cow attributable to the phosphoroate compound is observed following treatment.

Example 8

In a field test conducted in late fall soon after the heel and bot flies deposited eggs, 20 calves having an average weight of 375 pounds are taken for systemic grub control treatment. No grubs are visible on the backs of the calves at this time. Five of the calves are injected with diethyl succinate solution of O,O-dimethyl O-(4-tertiary-butyl-2-chlorophenyl) phosphoroate prepared in a manner similar to that described in Example 1. The phosphoroate composition is administerd at a dosage of 25 milligrams per kilogram. The remaining 15 calves are left untreated as controls. Thereafter, the cattle are examined on the backs for development of nodular dermal cysts harboring live cattle grub larvae. After 2 weeks, some of the calves develop nodular dermal cysts harboring grubs. Observations are made every 2 weeks. Grub counts made 11 weeks after the start of the treatment show that the treated calves are substantially free of grubs whereas untreated control calves have a large number of grubs.

Example 9

100 milliliters of a 4 percent spray composition of O,O-dimethyl O-(2,4-dichlorophenyl) phosphoroate in isoparaffin oil having a flash point of 130° F. is applied to the skin surfaces of a 138 kilogram cow infested with live screwworm larvae in the area of a neck wound. Application is made so that the spray did not come in direct contact with the larvae. Four hours after administration, an examination reveals that all larvae are dead.

Example 10

15.5 milliliters of a solution of O,O-dimethyl O-(2,4-dichlorophenyl) phosphoroate in diethyl succinate prepared as described in Example 5 was injected intramuscularly in the hip of a 155 kilogram calf heavily infested in the area of a neck wound with screwworm larvae. The dosage was sufficient to supply 50 milligrams of phosphoroate per kilogram of body weight.

24 hours after administration, the wound was examined and it was found that 90 percent of the screwworm larvae were dead. Examination of the wound after several days showed no live screwworms and a marked healing with the wounds scabbed over and of much reduced size. No adverse effects to the calf were noted.

Example 11

Concentrate compositions are prepared containing at least one of the following phosphoroates as active toxicant: O,O-dimethyl O-(2,4,5-trichlorophenyl) phosphoroate, O,O-dimethyl O-(4-tertiary-butyl-2-chlorophenyl) phosphoroate, O,O-dimethyl O-(2,4-dichlorophenyl) phosphoroate and O,O-dimethyl O-(3,4-dichlorophenyl) phosphoroate. The concentrate compositions are wettable powders containing 25 parts by weight of phosphoroate compound, 44 parts of kaolin clay, 28 parts of diatomaceous earth, two parts of a polymerized sodium salt of a substituted benzoid alkyl sulfonic acid (Daxad Number 27) and one part of sodium naphthalene sulfonate (Nekal A). These ingestible concentrate compositions are prepared by mechanically mixing and grinding together the indicated constituents.

A portion of the concentrate composition containing O,O-dimethyl O-(2,4,5-trichlorophenyl) phosphoroate prepared as above described is dispersed in water to obtain an aqueous drench. The aqueous drench is orally administered to yearling calves infested with cattle grub larvae. The composition is found to have good controls of the cattle grub larvae in the treated calves.

Example 12

A portion of the concentrate composition containing O,O-dimethyl O-(4-tertiary-butyl-2-chlorophenyl) phosphoroate prepared as described in Example 11 is dispersed in grain ration to produce an animal feed containing 3.3 grams of O,O-dimethyl O-(4-tertiary-butyl-2-chlorophenyl) phosphoroate per six pounds of feed. This composition is fed for a period of seven days to a yearling calf weighing 300 pounds and voiding a large number of nematode ova. The amount corresponds to 25 milligrams of phosphoroate compound per kilogram of body weight. Following treatment examination of the feces shows substantially complete reduction in number of nematode ova.

Example 13

Portions of the concentrate compositions containing O,O-dimethyl O-(2,4-dichlorophenyl) phosphoroate and O,O-dimethyl O-(3,4-dichlorophenyl) phosphoroate and prepared as described in Example 11 are dispersed in a commercial poultry mash to prepare feed compositions containing 0.2 percent by weight of phosphoroate compound. These compositions are fed as a sole ration for a period of 2.5 months to two flocks of chickens. Each flock consists of ten adult chickens of same history and past environment. The amount ingested by the flocks corresponds to dosages of 130 milligrams of phosphoroate compound per kilogram of body weight. A similar flock is fed unmodified mash to serve as checks. Such treatment controls blood-sucking parasites of fowls such as fleas (*Ceratophyllus gallinae*), fowl ticks (*Argas pericus*) and mites (*Dermanyssus gallinae*).

Example 14

Concentrate compositions prepared as described in Example 11 are dispersed in water to produce a spray composition containing 0.75 parts by weight of the phosphoroate compound. These compositions are adapted to be employed to supply a chemotherapeutic dose of a phosphoroate compound. When so employed these compositions give good control of many parasites attacking animals.

The phosphoroates employed in the practice of this invention may be prepared by reacting two molar proportions of sodium methoxide with one molar proportion of a suitable chloroaryl phosphorodichloridate having the formula

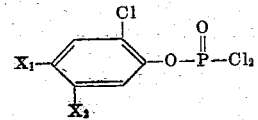

In such operation the alkoxide is added at a temperature of from 30° to 80° C. to the phosphorodichloridate agent dispersed in an inert solvent such as benzene. Following the reaction, the product is isolated in a conventional manner.

We claim:

1. A method for controlling parasites attacking warm-blooded animals which comprises administering to the animal a chemotherapeutic dosage of a systemic agent comprising a phosphoroate having the formula

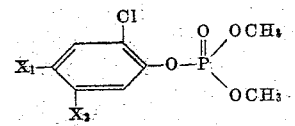

wherein $X_1$ represents a member of the group consisting of chlorine and tertiary-butyl and $X_2$ represents a member of the group consisting of chlorine and hydrogen, and wherein when $X_1$ is tertiary-butyl, $X_2$ is hydrogen.

2. In the practice of animal husbandry, the step of administering to a warm-blooded animal a composition containing a systemic agent, said systemic agent being a phosphoroate having the formula

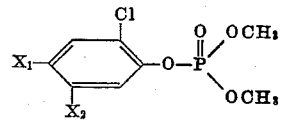

wherein $X_1$ represents a member of the group consisting of chlorine and tertiary-butyl and $X_2$ represents a member of the group consisting of chlorine and hydrogen, and wherein when $X_1$ is tertiary-butyl, $X_2$ is hydrogen.

References Cited in the file of this patent
UNITED STATES PATENTS

| | | |
|---|---|---|
| 2,599,515 | Moyle | June 3, 1952 |
| 2,811,480 | Norris | Oct. 29, 1957 |